(Model.)

W. RAYNER.
NUT LOCK.

No. 425,457.  Patented Apr. 15, 1890.

Witnesses:
W. E. Bowen.
Benj. Miller.

Inventor:
William Rayner,
By J. E. M. Bowen
Attorney.

UNITED STATES PATENT OFFICE.

WILLIAM RAYNER, OF NEWARK, NEW JERSEY.

NUT-LOCK.

SPECIFICATION forming part of Letters Patent No. 425,457, dated April 15, 1890.

Application filed December 3, 1888. Serial No. 292,501. (Model.)

*To all whom it may concern:*

Be it known that I, WILLIAM RAYNER, a citizen of the United States, and a resident of Newark, in the county of Essex and State of New Jersey, have invented certain new and useful Improvements in Nut-Locks, of which the following is a specification.

My invention relates to means for locking nuts on screw-bolts; and it has for its object the devising of an implement whereby the nuts may be securely fastened to the bolts without the use of any extraneous fastening means, and by an implement removable after the locking has been effected, and which can be manipulated by the same tool which is used by the workman to screw the nut home on the bolt.

My invention consists in the implement hereinafter described, the novel features whereof for which protection by Letters Patent is desired being specified in the claim at the end of this description.

Figure 1:
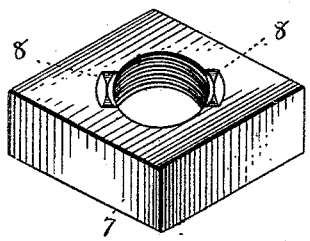
Figure 2:
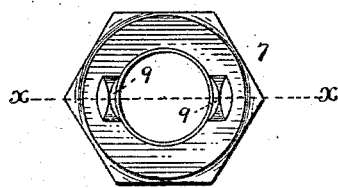
Figure 3:
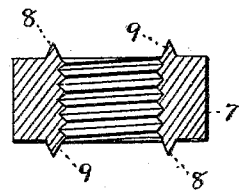
Figure 4:
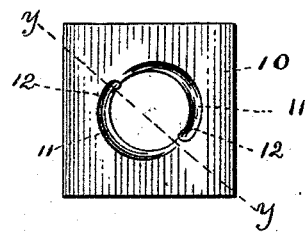
Figure 5:
Figure 6:
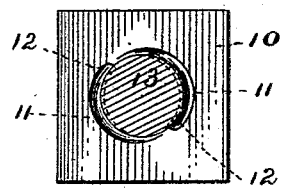

In the accompanying drawings, which form a part of this specification, and in which like features are indicated by like figures of reference in the several views, Figure 1 is a perspective view of an implement constructed in accordance with my invention. Fig. 2 is a plan view of said implement. Fig. 3 is a section through line $x\ x$ of Fig. 2. Fig. 4 is a plan view of a nut which has been operated upon by my nut-locking implement. Fig. 5 is a cross-section through line $y\ y$ of Fig. 4, and Fig. 6 is a plan view looking at the exposed face of the nut when in position on the bolt, the end of the bolt being cut off, and hence shown in section.

Heretofore nuts have been locked on bolts by the use of a permanent conoidal washer provided with a rib extending entirely around its inner edge and projecting a uniform distance laterally therefrom, so as to impinge upon the face of the nut, whereby when the nut is being screwed home said conoidal washer is flattened out against the surface of the object through which the bolt is inserted, and a portion of the metal of the nut is by the impingement of the rib displaced and forced convergently against the bolt. The washer of course remains fixedly attached to the bolt along with the nut.

As a modification of the locking means just described there has also been employed a conoidal washer provided with one or more projections with apices spirally inclined in opposite directions from that of the pitch of the bolt and nut screw-threads. In this case also the conoidal washer is a permanent feature of the locking means. By my invention I dispense with the cost of these locking-washers.

I am also aware of the existence of a tool for locking nuts to bolts, comprising a hammer-head, an eye for the insertion of a handle, and having at the end opposite the hammer-head a recessed face provided with sharp penetrating edges arranged concentric to the recess of the face. In using such a tool its recessed face is centered over the end of the bolt and held against the nut on the bolt and struck by a hammer, the blow crimping the metal of the threads of the nut into the threads of the bolt, and thus locking the nut on the bolt. Aside from the objections oftentimes to a blow on the nut, it will be readily understood that when the threads of the nut are crowded into the threads of the bolt to any depth the nut must be wholly retapped before being again used if it should be removed for purposes of repairs to the structure in which the bolt and nut are employed. Moreover, to use this tool the workman must possess some degree of skill to properly center the same on the nut in order to upset the metal uniformly at opposite points by the blow of the hammer. Furthermore, the tool by which the nut is screwed home cannot be used to effect the locking, and in place of the wrench the workman is required to take up two independent tools—the nut-locker and a hammer.

In making use of my nut-locking implement it is screwed on the end of the bolt the same as the nut, and centers and adjusts itself to position to be operated upon by the wrench which screwed the nut home. An inexperienced person can lock the nut as safely as a skilled workman, and, as the implement is self-centering, every nut will be locked uniformly, and a single implement will lock a large number of nuts with no expense for locking means outside of the first cost of the implement.

Referring now to the drawings, 7 indicates the nut-locking implement, which consists of hardened steel properly tempered to make it tough. This implement is screw-threaded internally, as shown, and it will be made of various sizes corresponding to the standard sizes of nuts and bolts, the aim being to have an implement or implements readily adapted for co-operating with the screw-threads on the various sizes of bolts that are made use of, and the tool may be square or hexagonal externally.

On one or both faces of implement 7, preferably both faces, it is provided with a pair of short ribs 8, which conform in pitch to the pitch of the screw-threads of the nuts with which the particular tool is to co-operate in locking the nuts on the bolts. The ribs 8 are beveled on their inner surfaces, as at 9, which renders the implement more effective in upsetting the metal of the nut. The ribs may be arranged uniformly on both sides of the implement 7; but that of course is not indispensable, the sole object in providing both faces of the implement with operating-ribs 8 being to save the time of the workman in adjusting the same on the bolt, since when both faces are alike it is immaterial which face is placed downward.

While ordinarily the implement 7 will be used without being secured in a stock, it may nevertheless be so secured and employed after the manner of a die.

In locking nuts with this implement the nut is first placed on the bolt to be made fast, and by means of the usual wrench the nut is screwed home. The nut-locking implement 7 of the required gage is then placed on the projecting end of the bolt and turned in contact with the exposed surface of the nut, and the workman applies the nut-wrench to the implement 7 and gives it a single turn of the requisite force and immediately releases it and removes it from the bolt end. This operation produces an impression in the exposed surface of the nut, such as shown in Fig. 4, which illustrates a nut 10 that has been operated upon and removed from its bolt. In this view, 11 indicates the curved depressions made in the surface of the nut by the plowing action of ribs 8 of the nut-locking implement. The deepest point of these depressions is at 12 at the end thereof. As the implement 7 is turned by the nut-wrench, its ribs 8 begin to plow into the metal of the nut 10 in close contact with the threads of the bolt, the metal of the nut adjacent to the bolt being thereby upset and forced into that thread only of the bolt which lies at or near the top surface of the nut, as indicated in dotted lines, Fig. 6, in which view 13 designates the bolt cut off close to the surface of the nut 10 to better illustrate the point just referred to.

The plowing action of implement 7 is rendered easy because of the fact that the metal of said implement is much harder than the metal of which the nut is made. The upsetting is therefore readily accomplished and with a comparatively slight turn of the nut-locking implement.

My implement is adapted for locking nuts on bolts in wood-work in carriage and car building, &c., as well as for locking nuts in general metal work and in railroad work.

Nuts locked by this implement in the manner explained are not liable to become loose, and, as already stated, the entire expense for the locking means is simply that of the implement itself, and one implement will last sufficiently long to lock a great number of nuts.

I am aware of United States Patents of J. E. Withers, No. 172,815, and R. Howarth, No. 321,500, and I do not lay claim to anything shown by them. In both of these patents the locking of the nut is made to depend upon certain peculiarities of the nut itself, which, when in position on the bolt, is locked by a chisel and hammer or by a "set." In the use of my invention there is employed the ordinary nut without any alteration whatever in its construction, and the locking of the nut is effected by means of an independent implement co-operating with the bolt, and which, when the locking has been accomplished, is removed from the bolt. I neither alter the nut nor specially construct it to enable it to be locked by a hammer and chisel; nor do I make use of tools, such as hammer and chisel, in effecting the locking operation, since my implement is designed to be manipulated by the usual wrench by which the nut itself is screwed home on the bolt. In other words, my invention comprises an implement which co-operates with the bolt and nut to lock the nut and is then removed from the bolt, the implement being manipulated by the usual wrench. It is not a part of the permanent locking means. Neither of the patents mentioned shows a locking implement—that is, a tool which, when it has locked the nut, is removed from the bolt and may be employed for locking an unlimited number of nuts.

Having thus described my invention, what I claim as new, and desire to secure by Letters Patent, is—

A nut-locking implement consisting of a nut provided with sharpened upsetting ribs or plows whose edges lie adjacent to and substantially tangential to the bolt-hole, substantially as set forth.

Signed at New York, in the county of New York and State of New York, this 15th day of November, A. D. 1888.

WILLIAM RAYNER.

Witnesses:
J. E. M. BOWEN,
HUGO KOELKER.